United States Patent
Nakagawa et al.

(10) Patent No.: US 6,419,382 B1
(45) Date of Patent: Jul. 16, 2002

(54) HEADLAMP FOR A VEHICLE

(75) Inventors: Masafumi Nakagawa; Kazuya Hashigaya, both of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/551,763

(22) Filed: Apr. 18, 2000

(30) Foreign Application Priority Data

Apr. 19, 1999 (JP) .......................................... 11-110420

(51) Int. Cl.$^7$ ................................................ B60Q 1/04
(52) U.S. Cl. ...................................... 362/547; 362/294
(58) Field of Search .............................. 362/517, 547, 362/345, 294, 373, 523, 549, 261

(56) References Cited

U.S. PATENT DOCUMENTS

| 5,113,320 A | * | 5/1992 | Haydu .......................... 362/547 |
| 5,597,232 A | | 1/1997 | Ohashi et al. |
| 5,678,916 A | | 10/1997 | Watanabe et al. |
| 5,865,531 A | * | 2/1999 | Frey et al. .................... 362/294 |
| 5,879,073 A | | 3/1999 | Hori et al. |
| 5,895,113 A | | 4/1999 | Ozaki et al. |
| 5,941,633 A | | 8/1999 | Saito et al. |
| 6,045,248 A | * | 4/2000 | Ashizawa .................... 362/294 |
| 6,168,303 B1 | * | 1/2001 | Ashizawa et al. ........... 362/547 |
| 6,224,247 B1 | * | 5/2001 | Ashizawa .................... 362/547 |

* cited by examiner

*Primary Examiner*—Sandra O'Shea
*Assistant Examiner*—Peggy A Neils
(74) *Attorney, Agent, or Firm*—Koda & Androlia

(57) ABSTRACT

A vehicle lamp comprising a lamp body and a lens that is installed at the front of the lamp body further comprising a unit housing chamber that houses a lighting circuit unit for lighting a discharge bulb installed in the lamp body. The unit housing is provided under the lamp body with a separation wall in between; and at the front end of the separation wall, an air flow opening is formed so that the interior of the unit housing chamber communicates with the interior of the light chamber. Further, an Ad extension reflector is provided over the opening so as to extend to the vicinity of the inner surface of a front lens. Air heated by the lighting circuit unit when the discharge bulb is lit flows into the lamp body through the opening and rises along the inner surface of the front lens, thus heating the front lens so that the front lens melts and removes snow covering the outer surface of the front lens.

2 Claims, 2 Drawing Sheets

HEADLAMP FOR A VEHICLE

BACKGROUND OF THE INVENTION

1. Field of the Invention

The present invention relates to a headlamp for a vehicle that has a discharge bulb.

2. Prior Art

In most headlamps for vehicles, a lamp unit provided with a light source bulb therein is tiltably installed in a lamp chamber that is formed by a lamp body and a front lens. Recently, a discharge bulb capable of high luminance irradiation has been employed as the light source bulb for vehicular headlamps.

In the meantime, in a headlamp for a vehicle, lighting of the light bulb increases the temperature of the front lens; and the thus heated front lens can melt snow that covers the outer surface of the front to lens some extent.

However, when a discharge bulb is used as the light source bulb, the temperature increase of the front lens is less compared to a halogen lamp used in conventional cases. Accordingly, the snow that covers the front lens freezes without melting even if there is not much snow. As a result, it is necessary to frequently remove the snow from the front lens.

SUMMARY OF THE INVENTION

In view of the foregoing problems with prior art lamps, the object of the present invention is to provide a headlamp for a vehicle that can effectively prevent freezing of the front lens of a vehicular headlamp that contains a discharge bulb.

More specifically, in view of the fact that a lighting circuit unit is provided in a headlamp that uses a discharge bulb, the present invention accomplishes the object by utilizing the heat generated by the lighting circuit.

More specifically, the present invention is a headlamp for a vehicle that comprises a light chamber formed by a lamp body and a front lens with a lamp unit provided with a discharge bulb being tiltably disposed in the light chamber, and the headlamp is characterized in that:

at the lower end of the lamp body, a unit housing chamber that houses a lighting circuit unit for lighting the discharge bulb is formed so as to be adjacent to the light chamber with a separation wall in between, and at the front portion of the separation wall, a communicating opening is formed so that the interior space of the unit housing chamber communicates with the interior space of the light chamber.

In the above, the "lamp unit" may be a so-called projector type lamp unit, or it can be a reflector unit that has a discharge bulb installed in an ordinary reflector.

Also, the "unit housing chamber" may be of a structure in which its main part is formed by the lamp body, or it can be a casing that is mounted to the lamp body.

Furthermore, the "front portion of the separation wall" is meant to be a position where the communicating opening is formed and the air heated in the unit housing chamber by the lighting circuit can flow into the front space of the lamp chamber through the communicating opening. In other words, the "front portion" is a position which is closer to the front than the central portion in the longitudinal direction of the separation wall.

As seen from the above, the headlamp of the present invention comprises a light chamber formed by the lamp body and front lens and a lamp unit that includes a discharge bulb is tiltably installed in the light chamber; and at the lower end of the lamp body, a unit housing chamber that houses the lighting circuit unit for lighting the discharge bulb is formed so as to be adjacent to the light chamber with the separation wall in between, and at the front portion of the separation wall, a communicating opening that allows the interior space of the unit housing chamber to communicate with the interior space of the light chamber is formed.

Accordingly, when the discharge bulb is lit, heat is generated in the lighting circuit unit; and as a result, heated air fills the inside of the housing chamber. Then, the heated air flows into the light chamber through the communicating opening which is formed in the separation wall. Since the communicating opening is located in the front portion of the separation wall, heated air flows into the front space of the light chamber and heats the front lens. Thus, the front lens heated by the heated air and therefore having an increased temperature can melt and remove the snow that covers the outer surface of the front lens.

Accordingly, freezing of the front lens is effectively prevented.

In the above structure, an extension reflector may be provided in the light chamber so that it is over the communicating opening and the front end thereof extends to the vicinity of the inner surface of the front lens. As a result, the heated air flowing into the light chamber through the communicating opening can be forcedly guided to the inner surface of the front lens along the bottom surface of the extension reflector. Thus, freezing of the front lens can be prevented more effectively.

DETAILED DESCRIPTION OF THE PREFERRED EMBODIMENTS

Figure 1:
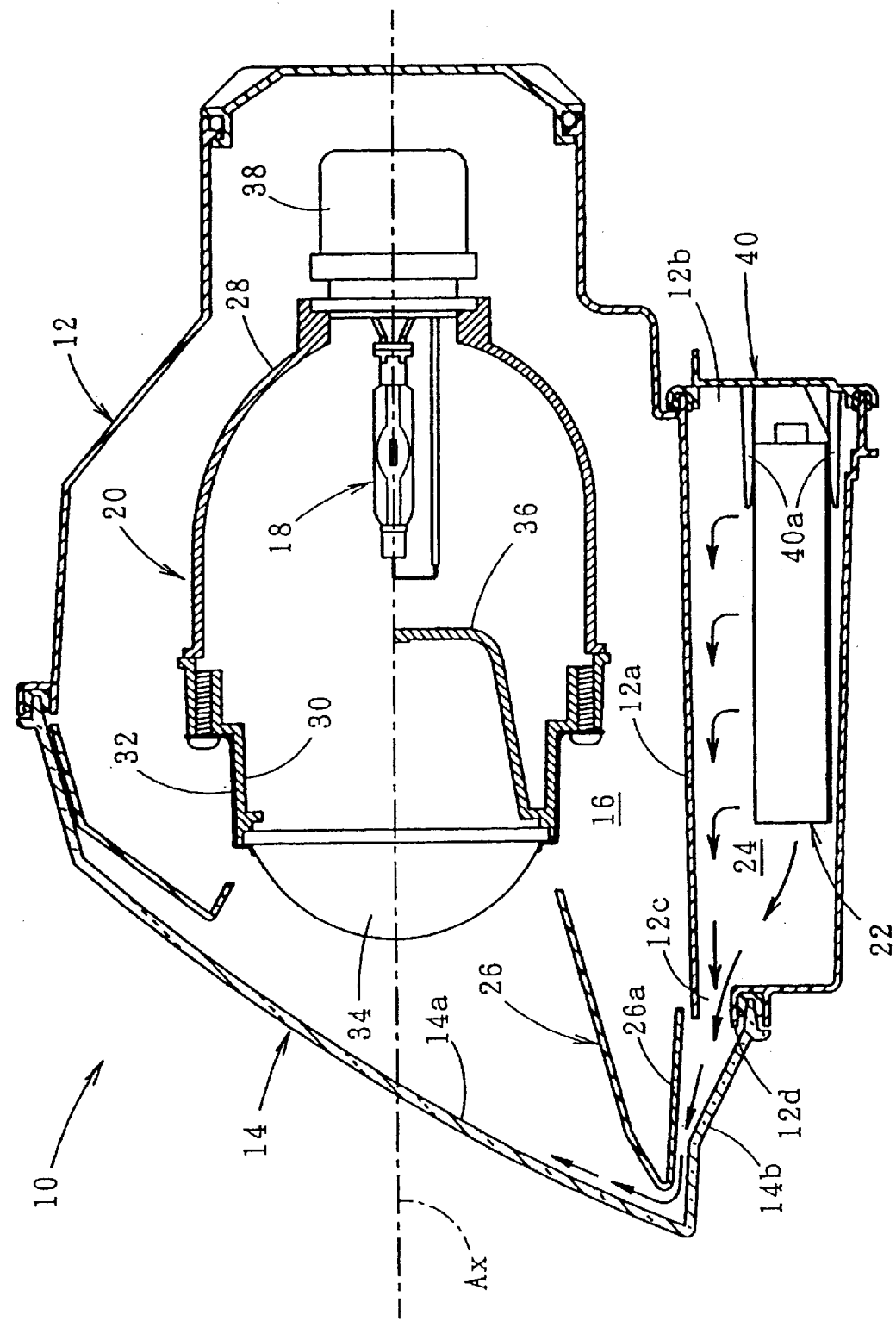
FIG. 1 is a sectional side view of a headlamp for a vehicle according to the first embodiment of the present invention.

As shown in FIG. 1, a headlamp 10 for a vehicle according to the present invention is a lighting device for irradiating a low beam. The headlamp 10 is comprised of a lamp body 12 and a front lens 14 so as to form a light chamber 16 therein and includes a projector type lamp unit 20 that is provided therein with a discharge bulb 18. The projector type lamp unit 20 may be disposed so as to be vertically and laterally tiltable in the lamp body 12.

At the lower end of the lamp body 12, a unit housing chamber 24 that houses a lighting circuit unit 22 for lighting the discharge bulb 18 is formed so as to be adjacent to the light chamber 16 with a separation wall 12a in between. In the vicinity of the inner surface 14a of the front lens 14 in the light chamber 16, an extension reflector 26 is provided so that the reflector 26 encloses the front end of the projector type lamp unit 20.

The front lens 14 is a transparent lens, and the projector type lamp unit 20 is provided with a light distribution control function for creating a low beam light distribution pattern. The projector type lamp unit 20 comprises a reflector 28 for fixedly supporting the discharge bulb 18 so that the bulb 18 is located on the optical axis Ax. The lamp unit 20 further comprises a cylindrical lens holder 30 fixed at the front end opening of the reflector 28, a condenser lens 34 which is located at the front end of the lens holder 30 and fixed by screws to the lens holder 30 via a retainer 32, and a shade 36 which is integrally formed with the lens holder 30.

The discharge bulb 18 is connected to the lighting circuit unit 22 via a bulb socket 38 and a high pressure cord which is not shown. This lighting circuit unit 22 is structured so that its starting circuit and stable circuit are housed in the lighting circuit case. The lighting circuit unit 22 is provided at a location closer to the rear end of the unit housing chamber 24. The unit housing chamber 24 is sealed from the space around the lighting device by a cover member 40 installed so as to cover the rear opening 12b which is a part of the lamp body 12. In the cover member 40, a plurality of ribs 40a are formed, so that the ribs 40a retain the lighting circuit unit 22.

At the front end of the separation wall 12a of the lamp body 12, a communicating opening 12c is formed. This communicating opening 12c allows the interior space of the unit housing chamber 24 to communicate with the interior space of the lamp chamber 16. The communicating opening 12c is opened in the front-to-rear direction of the lamp body 12 and is located adjacent to the upper side of a lens seal groove portion 12d of the lamp body 12. The lateral width of the communicating opening 12c is set to be generally the same as the lateral width of the lighting circuit unit 22.

At the lower end of the extension reflector 26, a folded flange 26a is formed. The folded flange 26a extends from the vicinity of the lower end corner portion of the inner surface 14a of the front lens 14 to the vicinity over the communicating opening 12c. The folded flange 26a is formed to create a clearance between the folded flange 26a and a lower end flange portion 14b of the front lens 14. The rear end of the folded flange 26a extends to a position adjacent to the separation wall 12a.

With the structure described above, when the discharge bulb 18 is lit, heat is generated by this lighted discharge bulb 18 inside the lighting circuit unit 22, and heated air fills the unit housing chamber 24. This heated air, as shown by arrows in FIG. 1, flows into the light chamber 16 via the communicating opening 12c of the separation wall 12a. The communicating opening 12c is opened so as to face forward at the front end of the separation wall 12a, and the folded flange 26a of the extension reflector 26 is located above the communicating opening 12. Accordingly, the heated air which flows into the light chamber 16 is guided to the lower end of the inner surface 14a of the front lens 14 along the bottom surface of the folded flange 26a and spreads in the light chamber 16 while rising along the inner surface 14a of the front lens 14. Because of this heated air flow, the front lens 14 is heated. The surface temperature of the front lens 14 can rise by approximately 30° C. (about 45 to 50° C. relative to the ambient temperature) compared to front lenses on which the heated air from the lighting circuit unit 22 is not guided.

Accordingly, even if the front lens 14 is covered by snow, the heated front lens 14 having an increased temperature can melt and remove the snow.

As described above, the head lamp 10 for a vehicle of the present invention employs the discharge bulb 18 as the light source. Accordingly, by way of using the heat from the lighting circuit unit 22, the front lens 14 is heated and prevented from freezing even under conditions where the front lens 14 is likely to freeze.

The lateral width of the communicating opening 12c is set to be substantially the same dimensions as the lateral width of the lighting circuit unit 22. Accordingly, the area through which the irradiation beam from the projector type lamp unit 20 permeates in the front lens 14 is reliably prevented from freezing.

Also, since the communicating opening 12c is formed so as to open to the front, the lamp chamber 16, the unit housing chamber 24 and the communicating opening 12c can be easily fabricated when molding the lamp body 12 even without particularly using a slide mold or the like.

The second embodiment of the present invention will be described with reference to FIG. 2.

Figure 2:
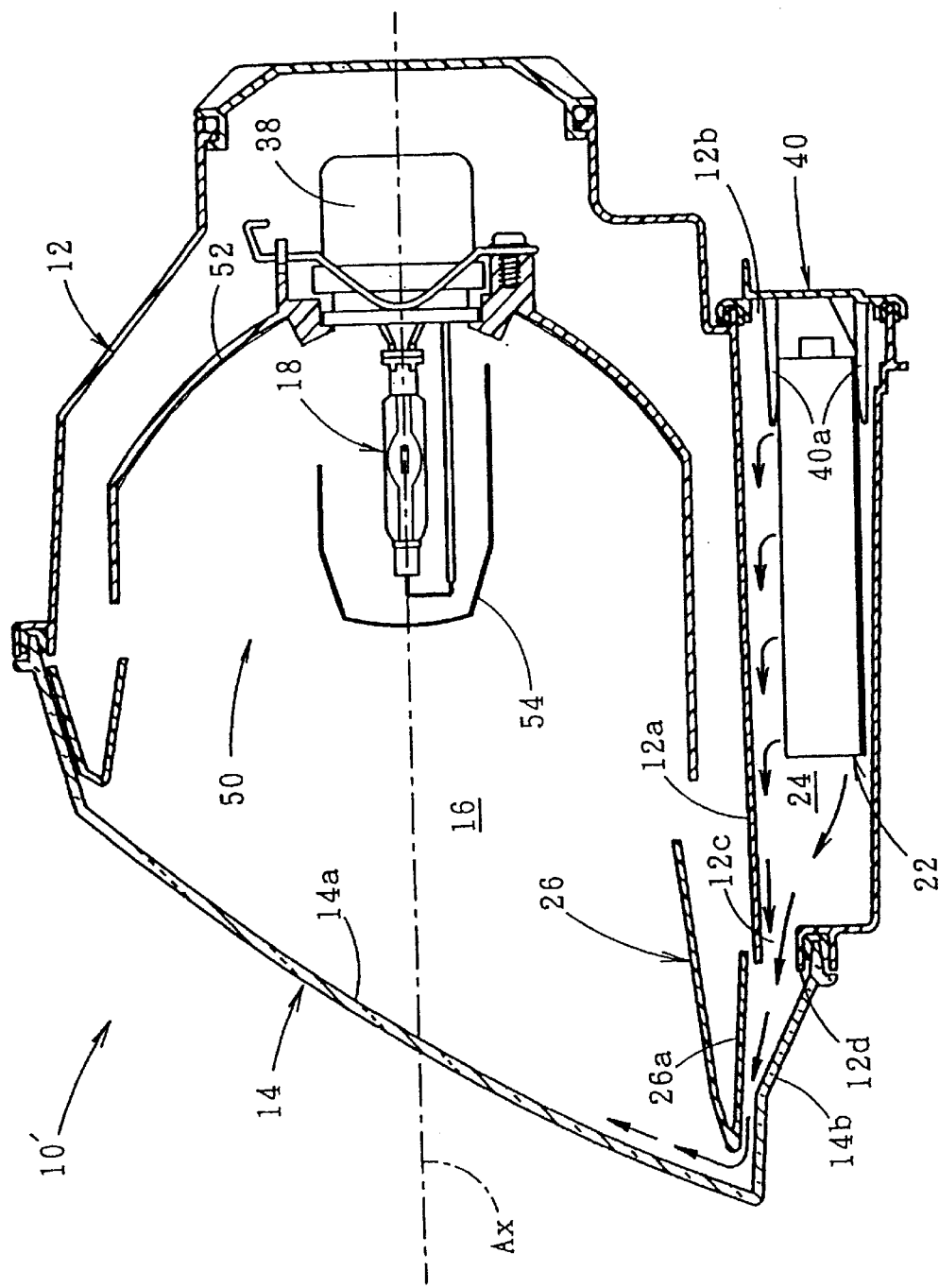
FIG. 2 is a sectional side view of a headlamp for a vehicle according to the second embodiment of the present invention.

As seen from FIG. 2, the lamp unit of the headlamp 10' of this second embodiment is a reflector unit 50 and not a projector type lamp unit 20. Other than this reflector type lamp unit, the structure is basically the same as the first embodiment which is for the projector type lamp unit 20.

Like the first embodiment, the front lens 14 of the second embodiment is a transparent lens, and the reflector unit 50 is provided with a distribution light control function for creating a low beam light distribution pattern. The reflector unit 50 comprises a reflector 52, which fixedly supports the discharge bulb 18 on the optical axis Ax, and a shade 54, which covers the discharge bulb 18 over a certain range.

In this structure, for the convenience of installing the reflector unit 50 that has a relatively larger vertical length in the light chamber 16, the vertical length of the unit housing chamber 24 is made slightly smaller compared to that of the first embodiment.

As in the first embodiment, heat is generated in the lighting circuit unit 22 when the discharge bulb 18 is lit, and air heated by this heat fills the inside of unit housing chamber 24. As indicated by arrows, the heated air flows into the light chamber 16 through the communicating opening 12c formed in the separation wall 12a. Further, the heated air which flows into the light chamber 16 is guided to the lower end of the inner surface 14a of the front lens 14 along the bottom surface of the folded flange 26a of the extension reflector 26, and it spreads in the light chamber 16, while rising along the inner surface 14a of the front lens 14, thus warming the front lens 14. Accordingly, the heated front lens 14 having an increased temperature can melt and remove the snow that covers the outer surface of the front lens 14.

Though the discharge bulb 18 is used as the light source, the headlamp 10' of this second embodiment is also extremely effective in preventing the front lens 14 from freezing by way of utilizing the heat of the lighting circuit unit 22.

In the embodiment shown in FIG. 2 as well, the lateral width of the communicating opening 12c is substantially the same as the lateral width of the lighting circuit unit 22. Accordingly, the area through which the irradiation beam from the reflector unit 50 permeates in the front lens 14 is prevented from freezing.

In both of above embodiments, the communicating opening 12c is formed at the front end of the separation wall 12a so as to open toward the front of the headlamp. However, the communicating opening 12c can also be formed near the front end of the separation wall 12a' so as to face upward.

Furthermore, in each of the above embodiments, the description is made for a headlamp that is used as a low beam irradiation lamp. However, the present invention is indeed applicable to a high beam lamp, a fog lamp and the like.

What is claimed is:

1. A headlamp for a vehicle in which a lamp unit provided with a discharge bulb is tiltably installed in a light chamber that is formed by a lamp body and a front lens, wherein:

at a lower end of said lamp body, a unit housing chamber that houses a lighting circuit unit for lighting said discharge bulb is formed so as to be adjacent to said light chamber with a separation wall in between, said lighting circuit unit heating air in said unit housing chamber, and at a front portion of said separation wall adjacent said front lens, a communicating opening that allows an interior space of said unit housing chamber to communicate with an interior space of said light chamber is formed, whereby said heated air from said unit housing chamber heats said front lens.

2. A headlamp for a vehicle according to claim 1, wherein an extension reflector is provided in a vicinity over said communicating opening in said light chamber so that a front end of said extension reflector extends to a vicinity of an inner surface of said front lens.

* * * * *